Figure 1:
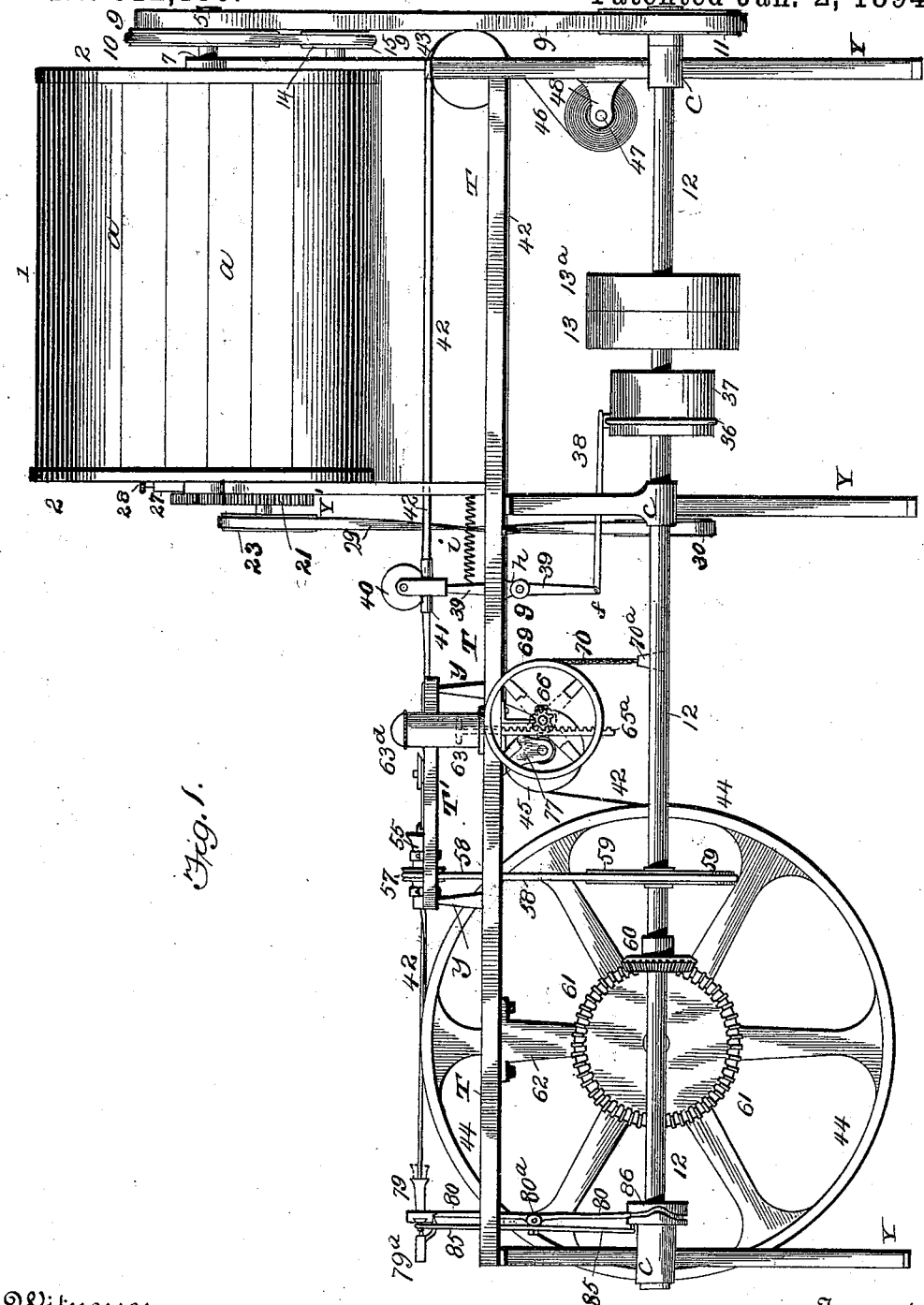

(No Model.) 9 Sheets—Sheet 5.

W. C. BRIGGS.
CIGARETTE MACHINE.

No. 512,150. Patented Jan. 2, 1894.

Witnesses
Inventor
William C. Briggs
By his Attorney
E. B. Clark (No Model.) 9 Sheets—Sheet 6.
W. C. BRIGGS.
CIGARETTE MACHINE.
No. 512,150. Patented Jan. 2, 1894.
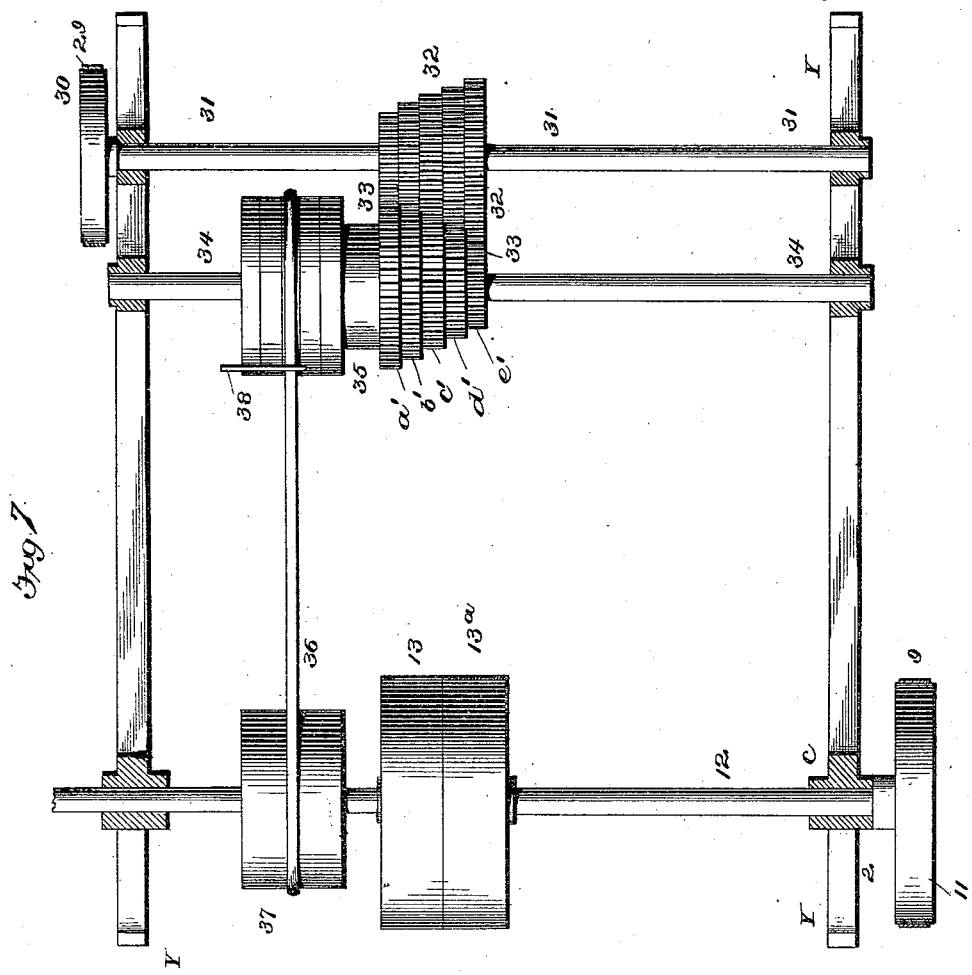
Witnesses
Inventor
William C. Briggs
By E. H. Clark
Attorney

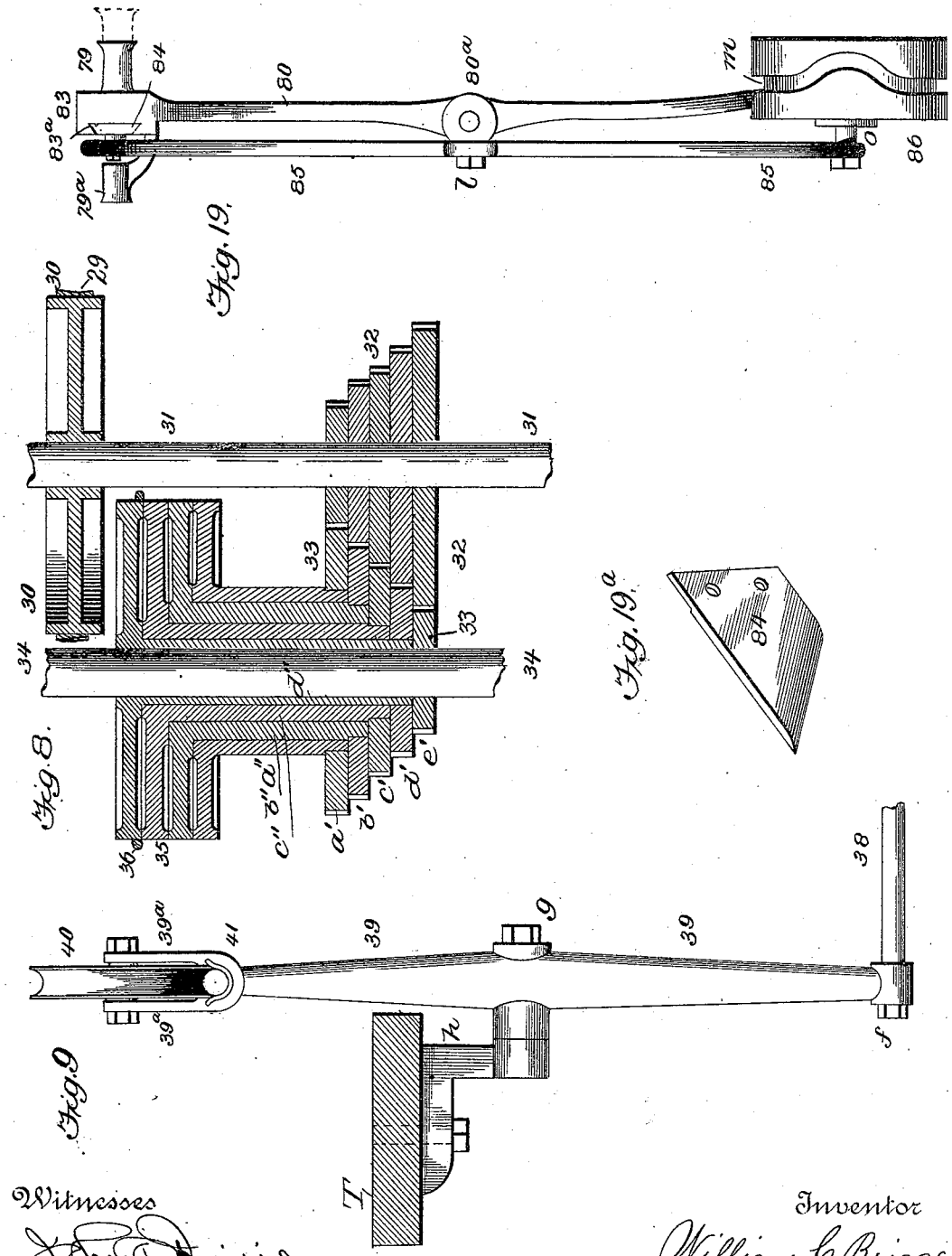

(No Model.) 9 Sheets—Sheet 8.
W. C. BRIGGS.
CIGARETTE MACHINE.
No. 512,150. Patented Jan. 2, 1894.
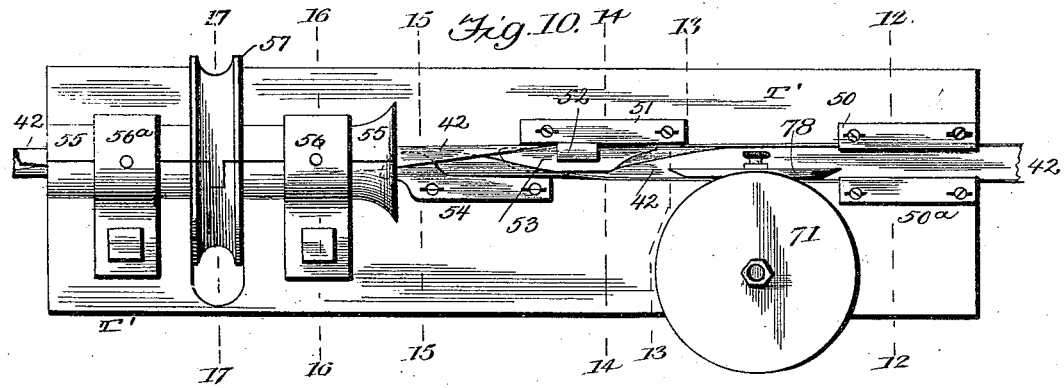
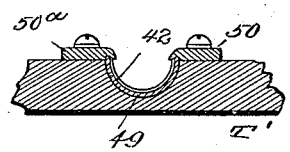
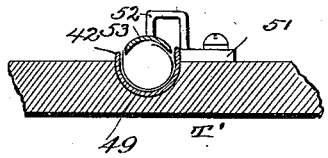
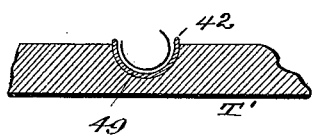
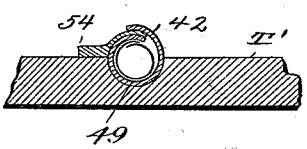
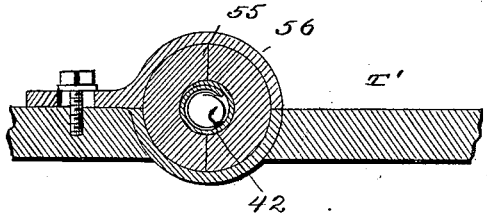
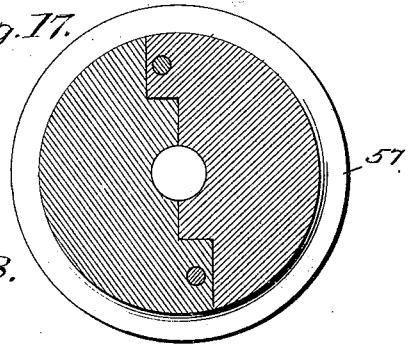
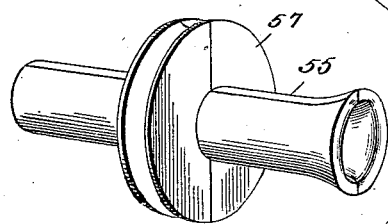
Witnesses
John Dinnie
M. R. M. Frayser
Inventor
William C. Briggs.
By E. S. Clark Attorney (No Model.)  9 Sheets—Sheet 9.
W. C. BRIGGS.
CIGARETTE MACHINE.
No. 512,150. Patented Jan. 2, 1894.
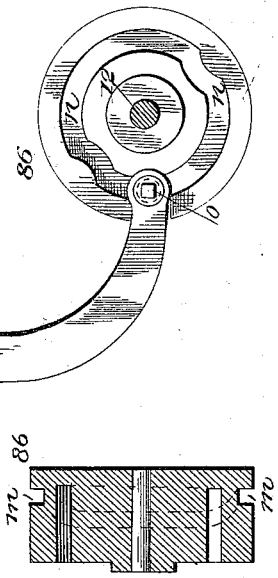
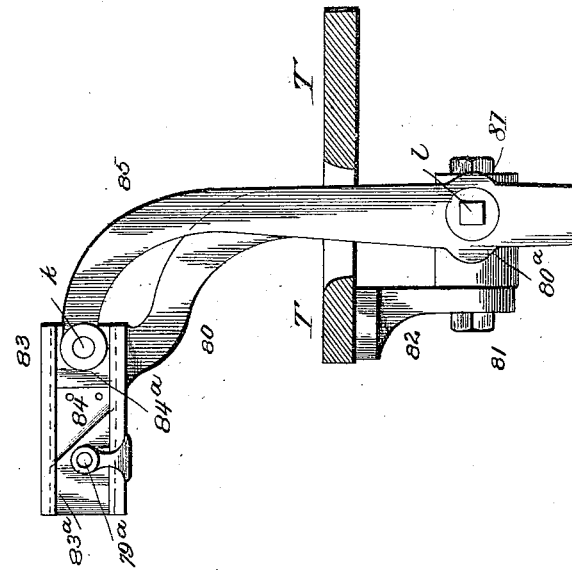
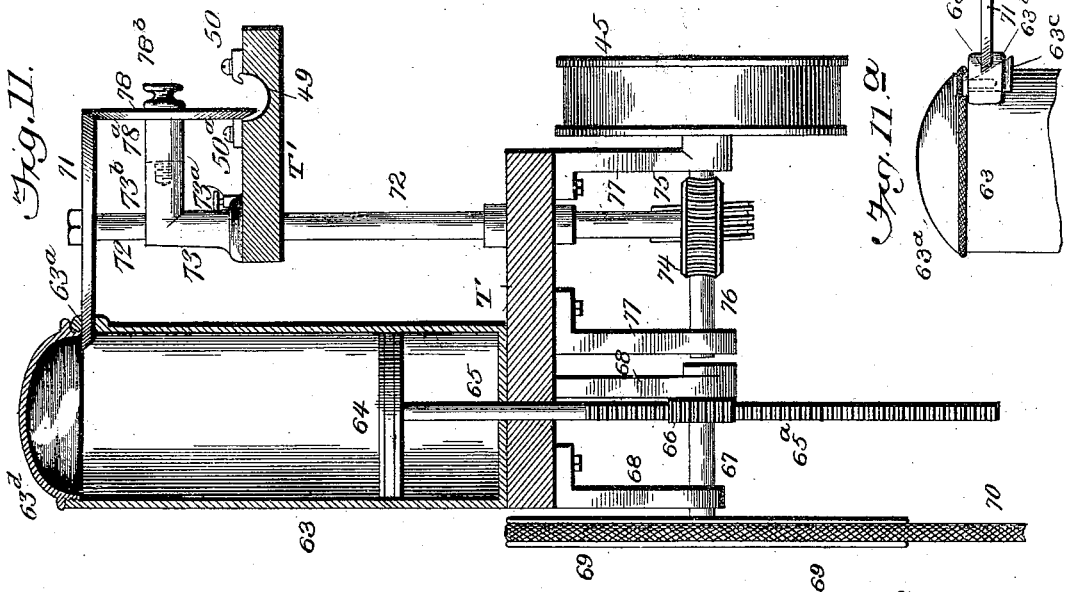

UNITED STATES PATENT OFFICE.

WILLIAM C. BRIGGS, OF FAYETTEVILLE, NORTH CAROLINA, ASSIGNOR TO THE WINSTON CIGARETTE MACHINE COMPANY, OF NORTH CAROLINA.

CIGARETTE-MACHINE.

SPECIFICATION forming part of Letters Patent No. 512,150, dated January 2, 1894.

Application filed July 8, 1892. Serial No. 439,385. (No model.)

*To all whom it may concern:*

Be it known that I, WILLIAM C. BRIGGS, a citizen of the United States, residing at Fayetteville, in the county of Cumberland and State of North Carolina, have invented certain new and useful Improvements in Cigarette-Machines; and I do hereby declare the following to be a full, clear, and exact description of the invention, such as will enable others skilled in the art to which it appertains to make and use the same.

This invention relates to a cigarette machine in which the tobacco stock is fed in regulated quantities, in the form of a sheet or layer, by means of a broad feed apron and a pair of rollers, to carding and distributing cylinders, from which it is deposited in suitable quantity to form a continuous filler upon the wrapper applied to the filler carrying tape, which filler, wrapper, and tape are conducted through the governing mechanism for regulating the feed of stock, and are thence conducted through the folding channel, where one edge of the wrapper is supplied with paste and in which the edges of the wrapper are successively turned over and sealed around the filler rod, forming the continuous cigarette, which as it continuously travels forward is cut into short lengths to form cigarettes by means of my cutting mechanism, all as fully hereinafter described.

My machine comprises as main features of construction, the feeding mechanism in conjunction with the distributing and carding cylinders; a governor by means of which the feed or supply of tobacco stock is regulated, so as to form a uniform filler rod; certain details of construction in the paste supplying mechanism; a spinning tube for sealing the wrapper around the filler rod while within the carrying tape; also certain improvements in the cutting mechanism, including a pair of pivoted oscillating levers, one of which carries the tubular cigarette holder, a guide way and cutting knife, which are reciprocated in line of the continuous cigarette, and the other of which is connected to and reciprocates the cutting knife transversely in its guide way for severing the continuous cigarette into short lengths.

My machine also embraces certain details of construction forming part of my invention by means of which a more perfectly operating machine is produced as will be hereinafter more fully pointed out in connection with the drawings.

The devices and features of construction constituting my invention will be defined in the claims.

My improved machine is illustrated in the accompanying drawings, in which—

Figure 2:
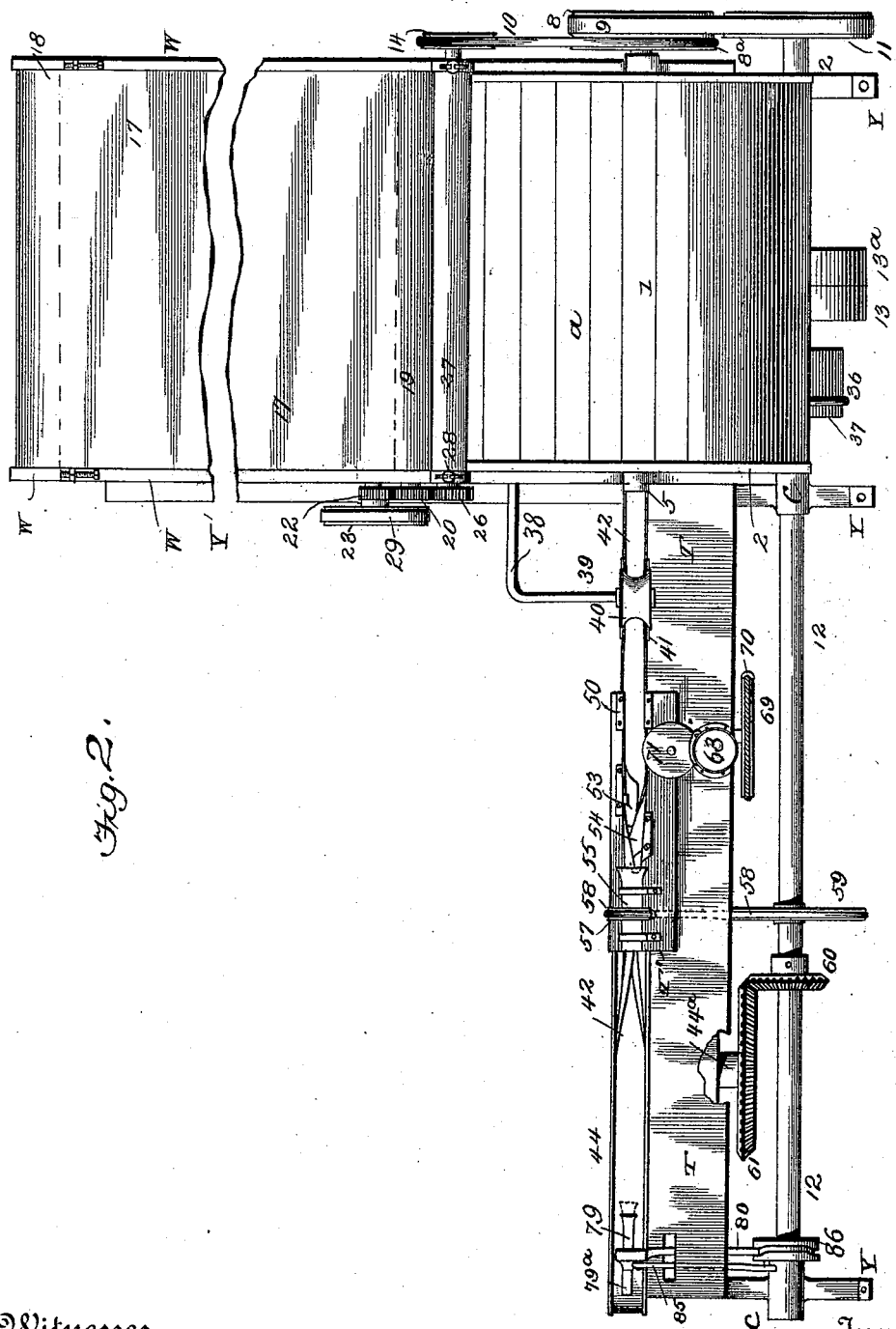
Figure 3:
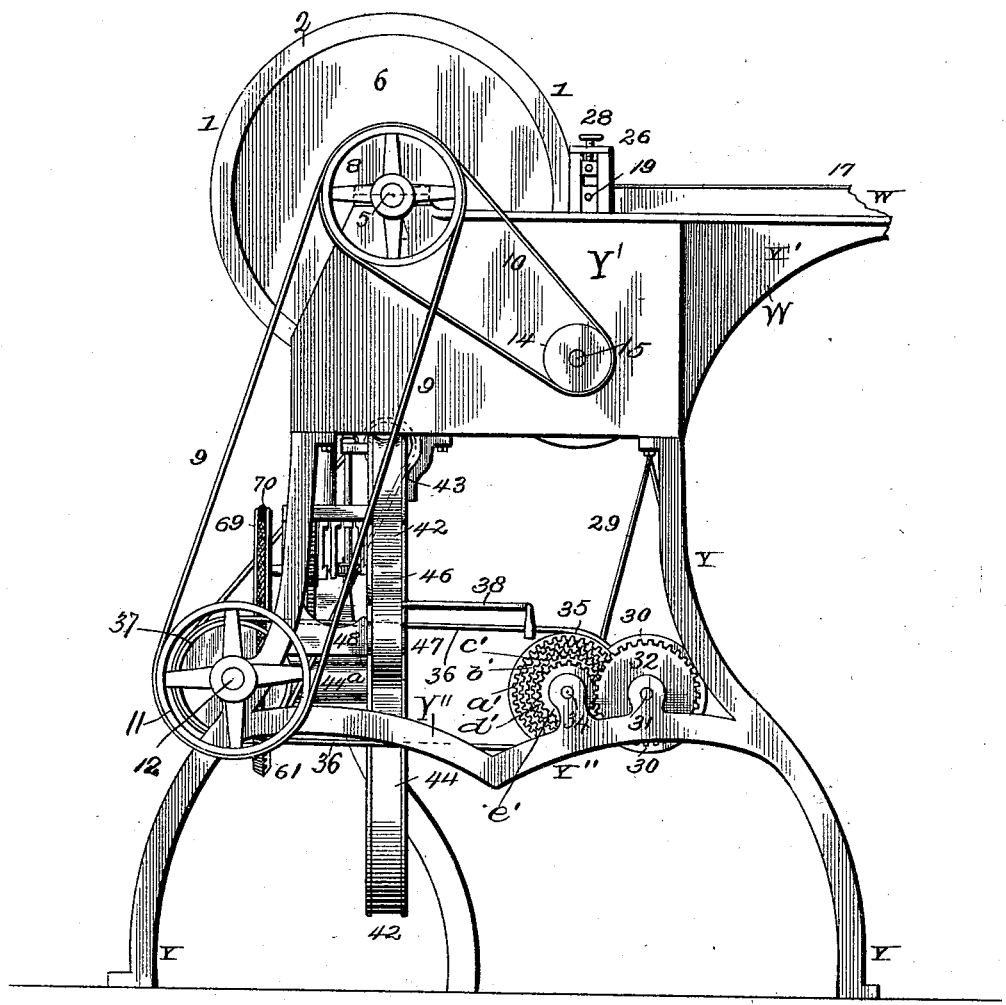
Figure 4:
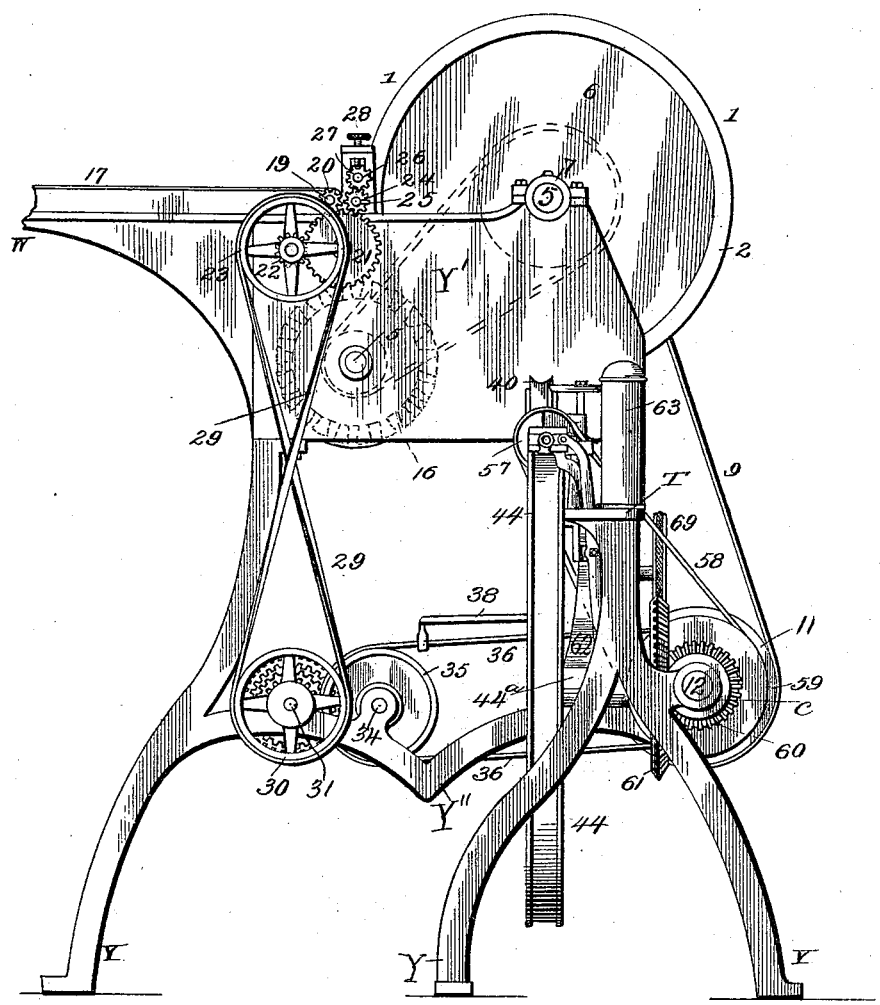
Figure 5:
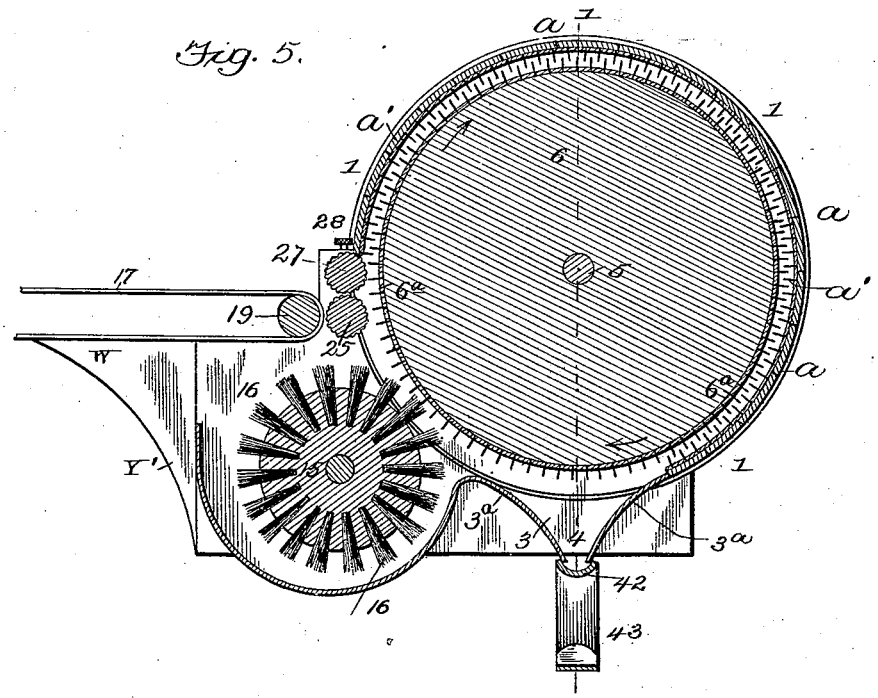
Figure 6:
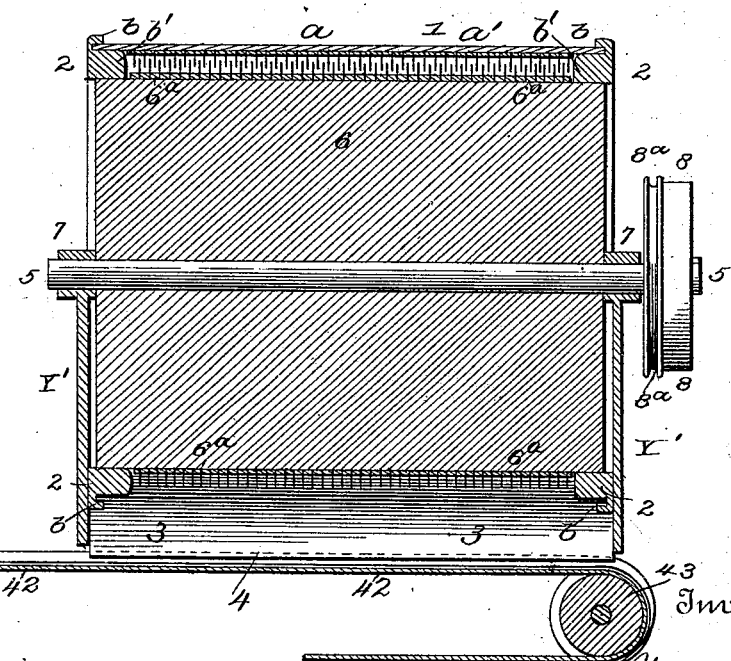

Figure 1 represents a left hand or rear side elevation of the machine. Fig. 2 represents a top plan view thereof with the feed apron and frame partly broken away. Fig. 3 represents an elevation of the front end of the machine with part of the feed apron and frame broken away. Fig. 4 represents an elevation of the rear end of the machine at which the finished cigarette issues with a part of the feed apron and frame broken away. Fig. 5 represents a transverse section of the feeding mechanism and the distributing and carding cylinders, looking toward the front end of the machine. Fig. 6 represents a longitudinal vertical section through the distributing and carding cylinders and a portion of the filler carrying tape below said cylinders. Fig. 7 represents a top plan view of the pulleys, gearing, and belt shifter (which connects with the governor) for operating the feed apron and other feed mechanism. Fig. 8 represents a sectional detail view, on enlarged scale, of the cone gearing, sleeve shafts and multiple pulley which latter carries the round belt for operating and regulating the feed mechanism. Fig. 9 represents a detail view, on enlarged scale, of the governor. Fig. 10 represents a top plan view on enlarged scale of the folding channel and attachments, paste wheel and spinning tube. Fig. 11 represents a sectional view on enlarged scale of the paste cylinder, paste wheels, and operating mechanism. Fig. 11ª represents a detail view in elevation of a part of the paste cylinder and wheel. Figs. 12, 13, 14, 15, 16, and 17 are sectional detail views on enlarged scale taken respectively on the section lines 12, 13, 14, 15, 16, and 17 in Fig. 10. Fig. 18 represents a perspective view of the split spinning tube and its pulley. Figs. 19 and 20 represent respectively a side and end elevation of the oscillating levers for carrying and operating the cutting mechanism. Fig. 19ª represents a perspective view of the reciprocating cutting knife. Fig. 21 represents a longitudinal section of the compound cam for operating the two oscillating levers.

The working parts of my machine are mounted and supported upon the table T and frame Y' and W, having supporting legs as shown. The bracket frame W, for supporting the feed apron is arranged at right angles to and at the front end of table T and frame Y. The outer carding cylinder or drum 1 is composed of wooden lagging or strips a, having an inner lining of card clothing a' and set at their ends into annular grooves b, formed in the metallic end rings 2, as best shown in Fig. 6. The end rings 2, are secured to the frame Y', and have cut in their inner faces the grooves, b, and have also the inwardly projecting shoulders, b' (Figs. 5 and 6) for securely supporting the lagging a. As will be seen in Fig. 5, the outer carding cylinder 1 does not extend entirely around the inner cylinder 6, but is comparatively open at the under side and up to the front thereof to provide a space for the fluted feed roller, the brush, and for the guide and discharge hopper below.

The guide and discharge hopper 3 is formed of the two curved plates 3ª, converging at the bottom to a longitudinal slot or opening 4, extending the whole length of the carding cylinders and above the filler carrying tape or belt. One of the curved plates 3ª also is curved below and partly around the brush 16, as shown in Fig. 5.

The inner carding cylinder 6, may be formed of wood or other suitable material and is secured to the shaft 5, which is mounted in the journal boxes 7, in the end frames Y'. This cylinder is covered around its entire circumference with card clothing 6ª, provided with suitable teeth in the well known manner. A belt wheel 8 8ª is secured to shaft 5 over which there pass the belts 9 and 10, (Fig. 3,) the belt 9 also passing over the pulley 11 on the main power shaft 12, which is supported in bearings c, and is provided with fast and loose pulleys 13 and 13ª, and serving to turn cylinder 6 (Figs. 1 and 3). A round belt 10, in the groove of pulley 8ª passes over the pulley 14 on shaft 15 (Fig. 3) which carries the revolving brush 16 (Fig. 5) for cleaning tobacco from the inner carding cylinder 6. The carding cylinder 6, turns from left to right as indicated by the arrow (Fig. 5), and the brush also turns from left to right so as to brush the tobacco from the carding teeth into the guide hopper 3, from which it is deposited into the filler carrying tape, 42. The broad feed apron 17, (Figs. 2, 4, and 5) passes at the front or outer end of frame W, over the adjustable roller 18, and at the inner end over roller 19, having at its rear end (Figs. 2 and 4) the pinion 20, which meshes with the intermediate gear wheel 21, mounted on a stud not shown, which in turn meshes with a small pinion 22, secured to the hub of the pulley 23, which is also mounted upon a short stud secured to the frame Y'. At the inner end of the feed apron, there are mounted two fluted feed rollers 25 and 27, (Fig. 5) which are provided at their rear ends with the pinions 24 and 26, which mesh with each other, and the lower one of which meshes with the gear wheel 21, from which it receives motion for turning the fluted feed rollers. The gear wheel 26 on roller 27 may be omitted and said roller caused to turn simply by frictional contact of the tobacco stock between it and roller 25. The upper feed roller 27 is preferably set in an adjustable journal box fixed in its frame, which journal may be adjusted by the screw 28, (Figs. 3 and 4.)

The feed apron and feed rollers are given motion through the medium of their pinions, the gear wheel 21, pinion 22, pulley 23, and cross belt 29, passing over said pulley 23, and the pulley 30 mounted on shaft 31, in the lower part of the frame Y'', as shown in Figs. 3, 4, and 8. The shaft 31, is mounted in a bracket on the frame and is provided with a set of cone gearing 32 (Fig. 8) which meshes with a corresponding set of gears 33, composed of the gear wheels, $a'$, $b'$, $c'$, $d'$, and $e'$, which are secured to the short sleeve shafts, $a''$, $b''$, $c''$, $d''$, and the solid central shaft 34. The solid shaft 34, is mounted in a bracket on the frame and serves to support the cone gearing, the sleeve shafts, and the multiple pulley 35. Each of the sleeve shafts, $a''$, $b''$, $c''$, and $d''$ is provided with a pulley, as shown in Fig. 8, which together constitute the multiple pulley 35. A round belt 36 passes over the pulley 35 and also over pulley 37 (Figs. 1 and 3) secured to the power shaft 12, and therefore imparts motion to the cone gearing, belt wheel 30, and through the cross belt 29 to the feed apron and feed rollers above described. The shafts 31 and 34 are supported in short bracket arms on the cross frame Y'' (Figs. 3 and 4).

The construction and operation of my governor or regulator will next be described with reference to Figs. 1, 2, and 9, as follows:

My governor comprises as main features of construction the pivoted oscillating lever 39, carrying at its upper end a grooved roller 40 and a guide trough 41 and having connected to its lower end the pivoted belt shifter 38. The oscillating lever 39 is pivoted at $g$ to a bracket or hanger $h$, which is secured to table T, and has connected at its lower end a bent shifting rod 38, which is provided with a fork at its outer end which embraces the round belt 36 on pulley 37 for shifting said belt on said pulley and also on the multiple pulley 35, for the purpose hereinafter explained. The bent shifting rod 38 may be either rigidly or pivotally connected at $f$, to lever 39. The oscillating lever 39 is provided at the top with the forks 39ª in the upper end of which is journaled a grooved compressing roller 40, and is also provided at the notch between the forks with a guide trough or groove 41, for supporting and guiding the carrier belt, paper, and filler rod, or stock, in conjunction with the grooved roller 40. A spiral spring $i$, is attached to the upper half of lever 39 and to the frame for producing the required tension on said lever.

In case too large a quantity of tobacco stock is fed on to the filler carrying tape and wrapper, such stock in passing between the grooved roller 40 and guide trough 41, will, on account of its excessive thickness, cause the upper part of lever 39 to be dragged forward, thereby moving backward the belt shifter 38, and shifting the belt 36 on pulley 37, and also upon the multiple pulley 35, the various disks of which connect with the cone gears, $a'$, $b'$, $c'$, $d'$ and $e'$, which mesh with the cone gears 32 on shaft 31, which, through the medium of its pulley 30 and the cross belt 29 and gearing at the top of the machine, acts to run the feed apron 17 and feed rollers 25 and 26 slower and thus lessen the feed of stock to the carding and distributing cylinders. As the forward drag or strain upon the upper end of lever 39 is diminished or removed the spiral spring $i$, draws back the upper end of such lever and therefore, again shifts the round belt 36, causing the feed apron and feed rollers to run faster, increasing the supply of tobacco to the carding and distributing cylinders and thence to the filler carrying tape. It is thus seen that the governor acts to run the feeding devices faster or slower and thus regulates the supply of tobacco which is fed to the carrier belt and paper wrapper for forming the filler rod.

My governor devices are very sensitive, and quickly act to regulate the feed of stock to the carrier tape, whereby I am enabled to produce a more uniform filler rod. This is an important feature of my invention. The endless carrier tape 42, passes, at the front end of the machine, over the grooved pulley 43, supported on the frame and thence passes below the lower edges of the curved plates 3$^a$ of the guide hopper 3 at the longitudinal slot or opening 4 (Figs. 5 and 6) and thence through guide trough 41, below grooved roller 40, of the governor, and on through the folding channel, and thence over and around the large belt wheel 44, up over pulley 45, and finally to grooved pulley 43, at the front end of the machine. The paper ribbon or wrapper 46 is taken from a reel 47, supported by a bracket arm 48 projecting from the frame at the front end of the machine, and is passed above the carrier tape over the grooved pulley 43, and thence with such tape below the carding cylinders through the governor, folding channel, &c. The large belt or tape wheel 44, is secured to a shaft, not shown, supported in the long sleeve or journal 44$^a$, carried by the hanger 62, which is secured to the under side of table T, and to the outer end of said shaft is secured the beveled gear wheel 61, which meshes with the beveled pinion 60, secured to the power shaft 12. The large belt or tape wheel 44, receives motion through the medium of the beveled pinion 60 and the beveled gear wheel 61, and serves for traversing the carrier tape or belt through the machine.

The folding channel and pasting devices, together with their operating mechanism, will next be described as follows: The folding channel (Figs. 10, 11, and 12) is formed in a small supplementary table T', which is supported by legs $y$ upon table T, and upon the top of such table are mounted the paste wheels, the folding devices, and the spinning tube for folding the wrapper around the filler rod, applying paste to its edges, and sealing it around said rod. A longitudinal groove or channel 49, is formed in the upper surface of table T', as shown in Figs. 11 to 15 inclusive, for receiving the filler carrying tape or belt and the paper wrapper containing the tobacco stock or filler. This channel 49, is preferably slightly tapered from front to rear to assist in shaping the filler rod, but I do not wish to be confined to a tapered form of channel. At the front end of channel 49, I provide a pair of guide plates 50 and 50$^a$, one on each side, secured by screws to the table and having downwardly and inwardly projecting lips for protecting the opposite edges of the carrier tape and wrapper, as shown in Figs. 10, 11, and 12. Beyond said plates and also beyond the paste wheel on the right hand side of the channel, I secure to table T', the plate 51, having an upwardly projecting curved arm 52, to which is connected a longitudinal and transversely curved separating finger 53 (Figs. 10 and 14) arranged a short distance above the bottom of channel 49, and serving to turn down one edge of the paper wrapper and separate it from the edge of the belt or carrier tape on that side of the channel. By these means one edge of the paper wrapper is turned down upon the filler rod, preparatory to being sealed thereon, while the edge of the belt is left standing and separated from the wrapper. Beyond the separating finger 53, and on the opposite side of the channel, I provide a belt and wrapper curver or deflector 54, secured to table T', which serves to turn down the left hand side of the carrier belt together with the pasted edge of the paper wrapper. The plates 51 and 54 are provided with slots and are adjustably secured to table T'. Beyond the belt curver 54, and in line with channel 49, I arrange the spinning tube 55 in journal boxes 56 and 56$^a$, which are secured by screw bolts to table T'. The spinning tube 55 is preferably made in two longitudinal halves or parts, each part having secured to or formed with it a half of the pulley 57, and the parts of such pulley 57 are provided with tenons and mortises by means of which, and suitable pins or screws, the parts are secured together, as shown in Figs. 10 and 17. The tube 55 is made in a split form to afford a convenient means of inserting the filler carrying tape into position and removing the same for repair, &c.; it is also made bell mouthed at the front end for more readily guiding the carrier tape and filler rod through it. The spinning tube is rapidly turned by means of the round belt 58, passed over the grooved pulley 57 and also over the grooved pulley 59, secured to the power shaft 12. The paste can 63, (Fig.
11) is mounted upon the table T, and is provided with a piston 64, attached to the rod 65, which extends down through the bottom of the can and the table and is provided at its lower end with a rack bar $65^a$, with which there meshes a pinion 66, fixed upon shaft 67, which is supported in hangers 68. Upon the outer end of the shaft 67 there is secured the grooved pulley 69 (Figs. 1, 2, and 11) over which is passed a cord 70, having at its lower end a weight $70^a$, one end of said cord being secured to said grooved pulley. By means of the weighted cord, pulley, shaft and pinion 66, meshing with rack bar $65^a$, the piston 64 is forced up into the paste can for feeding paste to the upper wheel 71, one edge of which projects through the transverse slot in the paste can, as shown in Fig. 11. The paste can Fig. $11^a$ is provided near its top with a horizontal slot $63^a$ and outwardly projecting lips $63^b$, for receiving the edge of the horizontal beveled paste wheel 71, and is also provided with a removable cap $63^d$. An adjustable wedge $63^c$ is fixed in the lips $63^b$, and is provided with a screw shank and nut for adjusting it up and down, adjacent to the face of the beveled paste wheel 71, for removing the excess of paste from said wheel or for regulating the amount of paste which is supplied thereto. The beveled horizontal paste wheel 71 is fixed upon the vertical shaft 72, which passes down through a long journal or hollow post 73, which is adjustably secured at its foot to the table T', by means of a set screw $73^a$. The shaft 72 projects down through and below table T, and is provided at its lower end with a worm wheel 74, which meshes with the worm 75, fixed upon the horizontal shaft 76, which is supported in hangers 77. The shaft 76 has secured to its outer end the pulley 45 (Figs. 1 and 11) over which passes the carrier tape or belt 42. The upper end of the hollow post 73 is provided with an outwardly projecting arm $73^b$, carrying at its outer end the beveled paste wheel 78 and its hub $78^a$ which are secured to the arm $73^b$ by a screw stud $78^b$. The beveled paste wheel, 78, makes frictional contact for the horizontal paste wheel 71, receiving therefrom paste and transferring it to the inner standing edge of the paper wrapper in channel 49.

The mechanism for cutting the cigarette into short lengths will now be described as follows: The tubular guide holder 79 and $79^a$, at the rear end of the machine is secured to the upper end of the pivoted vibrating lever 80, which is provided near its middle portion with a hub $80^a$, placed upon a stud 81, which is supported by the hanger 82, connected to the table T. The vibrating lever 80, is curved laterally at its upper and lower ends, and has connected to its upper end a head block 83, containing the tubular holder 79, and also a transverse dove-tail groove $83^a$, for receiving the reciprocating cutting knife 84, which is secured by screws or rivets to the reciprocating block $84^a$, which latter is pivotally connected at k, to the upper end of the oscillating lever 85. This lever 85, is pivotally connected at l, near its middle portion to the hub $80^a$ of the vibrating lever 80, and engages at its lower end by means of the roller o, with the cam groove n, in cam 86, as shown in Figs. 19 and 20. The vibrating lever 80, gives reciprocating longitudinal motion to the head 83, containing the tubular holder and the cutting knife, in line with the traveling cigarette. The head of said lever moves forward with the cigarette during the moment in which the cutting knife severs it for cutting it into cigarette lengths. The lower end of the vibrating lever 80 engages by means of a roller not shown, with the cam groove, m, in cam 86, which is secured to the power shaft 12, as shown in Figs. 2 and 19. The compound cam 86, has cut in its peripheral face the double cam groove m, for operating lever 80, and in one of its flat ends or sides the double cam groove n, for operating lever 85, as shown in Figs. 19, 20 and 21. The cutting knife 84, shown in Fig. $19^a$ is provided with an inclined or diagonal cutting edge, and is connected at its rear end by means of screws, to the reciprocating block $84^a$, which is pivotally connected at k, to lever 85. The knife 84, is reciprocated between the parts of the tubular holder 79 and $79^a$ for cutting the cigarette into lengths as it passes through such holder. The part $79^a$ of the tubular holder is secured by means of a curved arm to the head 83 below the reciprocating cutting knife, so that such knife may be readily moved back and forth.

The operation of my cigarette machine is very simple and can be successfully managed by one or two attendants. The filler carrying tape and paper wrapper being arranged in position in the folding channel and the other parts of the machine being in readiness, the power belt is shifted onto the fixed pulley of power shaft 12, thereby setting the machine in motion. The fine cut tobacco stock is then spread in a thin layer on the feed apron 17 by which it is carried to the fluted feed rollers 25 and 27, from which it is delivered to the carding cylinders, by means of which it is suitably opened and distributed into the guide hopper 3, any fibers which adhere to the inner carding cylinder being swept down into the hopper by the revolving brush 16. The tobacco stock is delivered into the guide hopper 3 in a loose form and is thereby conducted down through the longitudinal slot 4 and deposited upon the paper wrapper in the filler carrying tape or belt in the form of a loose roll of stock adapted to be formed into the filler rod. The roll of stock thus deposited is continuously carried forward by the carrier tape and passes from the hopper 3 through and between the guide trough 41, and the grooved roller 40, of the governor, where the fibers of tobacco are rolled down and compressed into the form of a filler rod. This rod is then conducted by the carrier tape into the folding channel 49, the edges of the tape and wrapper being protected and held in place by the flanged guide plates 50 and 50ᵃ. As the tape and wrapper pass along in the channel, paste is applied to the left hand standing edge of the wrapper by means of the revolving paste wheel 78. Then the right hand edge of the wrapper is folded down upon the filler rod, and is separated from the traveling tape by means of the curved folding and separating finger 53. After leaving finger 53, the left hand side of the wrapper and tape are turned over by the deflector 54, thereby lapping the pasted edge of the paper upon the previously turned down edge, and now the right hand edge of the traveling tape is turned down and over the left hand edge by means of the spinning tube 55, which is rapidly revolved and serves to press the pasted edge of the wrapper upon the other edge thereof and seal such wrapper around the filler rod, thereby forming a continuous cigarette. The spinning tube, by its rapid revolution, also serves to partially dry the sealed joint of the wrapper, so that it is not liable to spread apart. As the carrier tape or belt and continuous cigarette pass out from the spinning tube the belt is spread apart by passing upon the large belt wheel 44, while the continuous cigarette is freely moved forward through the tubular holders 79 and 79ᵃ, where it is cut into cigarette lengths by means of the reciprocating knife 84. During the transverse forward stroke of the reciprocating cutter through the continuous cigarette for cutting it into short lengths, the head 83, which carries the holder and cutting knife is moved forward in line with the continuous cigarette by means of the oscillating lever 80, so that there is no back pressure on such cigarette during the cutting stroke, thereby preventing cramping or bending thereof which would be liable to burst the wrapper or separate its freshly sealed edges.

During the operation of the machine and formation of the filler rod, as before explained, the feed of stock to the carding and distributing cylinders and thence to the wrapper in the filler carrying tape is regulated and controlled by my governing device hereinbefore described.

As a result of my governing device, my improved folding channel and cutting mechanism, I obtain a well formed, smooth and merchantable cigarette.

Having described my invention, what I claim, and desire to secure by Letters Patent, is—

1. In a cigarette machine, the combination with the outer carding cylinder, provided internally with card clothing, the interior carding and distributing cylinder, the curved plates 3ᵃ, forming the guide hopper 3, at the under side of the said outer cylinder, a filler carrying tape arranged below the open end of said hopper and means for feeding the tobacco stock to the carding cylinder, substantially as described.

2. In a cigarette machine, the combination with a traveling feed apron, and a pair of feed rollers at the inner end of such apron, of the inner and outer carding cylinders, provided with card clothing and a guide hopper 3, and a filler carrying tape below said cylinders, and hopper, substantially as described.

3. In combination with the inner and outer carding cylinders, provided respectively with card clothing, a pair of fluted feed rollers adjacent thereto for supplying them with tobacco, a revolving brush for removing tobacco from the inner carding cylinder, a guide hopper 3, below the brush, and a filler carrying tape below the open end of said hopper, substantially as described.

4. The inner carding cylinder 6, journaled in the frame or casing, in combination with the end rings 2, supported in the frame and having interior grooves $b$, the lagging strips $a$, having the inner lining of card clothing and set in the grooves $b$, and forming the outer carding cylinder, a pair of feed rollers adjacent to the carding cylinders for feeding tobacco thereto, a guide hopper below the carding cylinders having a longitudinal opening and a filler carrying tape below the opening of said trough, substantially as described.

5. In combination with the filler and wrapper carrying tape, and means for supplying tobacco stock thereto, a governor through which such tape and stock pass, and mechanism connecting with said governor for regulating the feed of tobacco, substantially as described.

6. In combination with the filler and wrapper carrying tape, and means for supplying tobacco stock thereto, a yielding or oscillating governor through which such tape and stock pass, and mechanism connecting said governor with the feeding devices for regulating the feed of tobacco to the wrapper carrying tape, substantially as described.

7. In combination with the carding and distributing cylinders one within the other, feed rollers for supplying them with tobacco stock, and the filler and wrapper carrying tape arranged below said carding cylinders, a governor through which said tape passes and suitable gearing and mechanism connecting said feed rollers with the governor, for regulating the feed of tobacco, substantially as described.

8. In a cigarette machine the combination with the feed rolls 25 and 27, a hopper and the filler and wrapper carrying tape containing the tobacco stock, below said hopper, a governor composed of a pivoted forked lever, having a grooved compressing and forming wheel mounted at the end of the fork, providing a passage for the carrier tape and stock, a belt shifter connecting with the lower end of said lever, and gearing connecting said shifter with the feed rolls, substantially as described.

9. In a cigarette machine, a governor composed of a pivoted vibrating lever having a fork at its upper end containing a guide trough in its notch, a grooved compressing and forming wheel mounted at the end of the fork and a belt shifting rod connected to its lower end, in combination with means for feeding tobacco and connecting devices between the governor and the means for feeding tobacco, substantially as described.

10. In combination with the feed mechanism, the carding and distributing cylinders one within the other, a filler and wrapper carrying tape below said cylinders, a governor through which said tape passes, suitable gearing for operating the feed mechanism and a belt shifter connecting the governor with the operating gearing, substantially as described.

11. In combination with the feed mechanism, the carding and distributing cylinders, one within the other a filler and wrapper carrying tape below said cylinders, a governor through which said tape passes, intermeshing cone gearing, a multiple pulley and other gearing for operating the feed mechanism, a belt on said multiple pulley and another pulley, and a belt shifter connecting the governor with said belt and gearing, substantially as described.

12. In combination with the folding channel and the deflectors therein, a revoluble or spinning tube adjacent to such channel through which the continuous cigarette and the carrier belt pass, substantially as described.

13. In combination with the folding channel, the deflectors and carrier belt therein, a revolving spinning tube and its pulley divided longitudinally and journaled adjacent to said channel, through which the continuous cigarette and carrier belt pass, substantially as described.

14. In combination with the longitudinal groove or folding channel, the filler carrying tape, the lateral guide plates, having downwardly turned lips for protecting the edges of said tape, a curved finger beyond said plates arranged to turn down one edge of the paper wrapper and separate it from one edge of the tape, a second deflector and curver on the opposite side of the channel and a spinning tube for sealing the wrapper around the filler, substantially as described.

15. The vertical paste cylinder having a transverse slot near its upper end and means for forcing paste upward therein in combination with a beveled horizontal paste wheel, 71, passing into such slot, a second beveled paste wheel, 78, making frictional contact with the first wheel and arranged vertically to apply paste to one edge of the paper wrapper within the folding channel, substantially as described.

16. The vertical paste cylinder having a transverse slot near its upper end and means for forcing paste upward therein in combination with the beveled horizontal paste wheel passing into such slot, and having a vertical shaft, 72, passing through the journal or hollow post, 73, and provided at its lower end with a worm wheel, a second beveled vertical paste wheel secured to a horizontal arm, and making frictional contact with the first wheel, the hollow post, 73, the folding channel below the vertical paste wheel, and a worm meshing with the worm wheel for operating the paste wheel, substantially as described.

17. The vertical paste cylinder, having a transverse slot near its upper end, a piston 64, and a downwardly extending rod, 65, formed as a rack-bar 65ª, in combination with pinion 66, shaft, 67, grooved pulley, 69, and cord, 70, having a weight at its lower end for forcing up the piston, a paste wheel working in the slot of the paste cylinder and operating gearing, substantially as described.

18. In a cigarette machine, a pair of pivoted levers, one being pivoted to the hub of the other, one of said levers carrying the tubular cigarette holder, a guide way and cutting knife, and the other of said levers being connected to the cutting knife, substantially as described.

19. A vibrating or oscillating lever provided at its upper end with a guide way containing a reciprocating cutter and having a hub near its middle portion, where it is pivotally connected to the frame of the machine, in combination with a second lever pivotally connected to said hub and also pivotally connected to the reciprocating cutter, substantially as described.

In testimony whereof I affix my signature in presence of two witnesses.

WM. C. BRIGGS.

Witnesses:
A. G. BROOKE,
WM. A. EASTERDAY.